Patented Mar. 28, 1939

2,152,408

UNITED STATES PATENT OFFICE 2,152,408

SECONDARY DISAZO DYESTUFFS

Charles Graenacher, Riehen, Richard Sallmann, Binningen, and Hans Johner, Basel, Switzerland, assignors to the firm of Society of Chemical Industry in Basle, Basel, Switzerland No Drawing. Application November 13, 1937, Serial No. 174,490. In Switzerland November 16, 1936

4 Claims. (Cl. 260—186)

It has been found that new azo-dyestuffs can be obtained by coupling compounds of the general formula

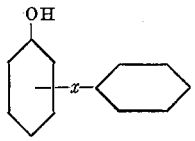

in which $x$ stands for a member of the group consisting of a diphenyl linkage and a $CH_2$—group, and in which the substituents of the phenolic nucleus are distributed in such a manner that the para-position to the OH—group is occupied, with such diazo-azo-compounds which do not contain OH—groups in ortho-position to the diazonium group. Depending on whether or not the diazo-azo-compound contains sulfo groups or carboxyl groups, there are thus obtained water-soluble or water-insoluble dyestuffs. The former can be used as wool dyestuffs or cotton dyestuffs, the latter are pigments which when produced on suitable substrata, dye the same fast tints. Different shades are obtained according to the selection of the diazo-azo-compounds.

The new azo-dyestuffs correspond therefore to the general formula

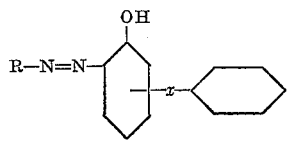

in which R stands for a radical of an azo-dyestuff and $x$ has the signification indicated above. Among these dyestuffs particularly the water-insoluble dyestuffs are suitable for the production of fast dyeings according to the processes described in applications Serial Nos. 92,244, 92,245, 92,246 and 134,453, wherein for example these dyestuffs are converted into water-soluble acyl derivatives which, when treated on the fiber with saponifying agents, regenerate the sparingly soluble dyestuffs.

Compounds of the above characterized general formula are for example 4-benzyl-phenol, 4-hydroxy-diphenyl, 4-hydroxy-3-chlorodiphenyl, 4-methyl-2-benzylphenol, 4:5-dimethyl-2-benzylphenol and the like. Diazo-azo-compounds which are particularly suitable are for example diazo-azo-compounds of the benzene or naphthalene series, such as for example those from aminoazobenzene, aminoazotoluene, 4:4'-diamino-2-methyl-5-methoxyazobenzene, 1-aminonaphthalene-4-azobenzene and the like.

The following examples illustrate the invention, the parts being by weight:—

Example 1

26.3 parts of 4-amino-3:2'-dimethylazobenzene hydrochloride are diazotized in the usual manner and filtered, if necessary. The diazonium solution is allowed to drop slowly into a solution consisting of 18.4 parts of 4-benzylphenol in 25 parts by volume of a sodium hydroxide solution of 30 per cent. strength, 50 parts of 2-n-sodium carbonate solution and 150 parts of water. Coupling takes place immediately with formation of a brown precipitate. Stirring is continued overnight, the whole is filtered the following morning, and the precipitate thoroughly washed and dried. It is a light brown powder and can be recrystallized with 15 times its quantity of benzene. The product purified in such a manner melts at 183–185° C. The new dyestuff of the

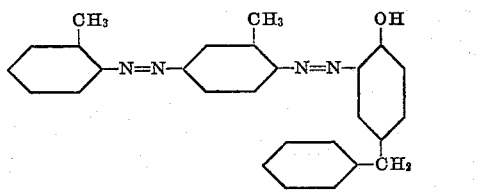

formula produces on cotton yellow brown tints.

The following table displays examples of further dyestuffs obtainable with aid of diazotized aminoazo-dyestuffs:—

The following table displays examples of further dyestuffs obtainable with aid of tetrazotized diamines:—

| | Diazotizing component | Coupling component | Dyeing produced on cotton |
|---|---|---|---|
| 1 | 4-amino-3:2'-dimethylazobenzene | 4-hydroxydiphenyl | Yellowish orange. |
| 2 | 4-amino-3':4'-dichloro-2:5-diethoxyazobenzene | do | Reddish brown. |
| 3 | 4-amino-2'-methoxy-5'-methyl-2:5-diethoxyazobenzene | do | Do. |
| 4 | 4-amino-2'-chloro-2:5-dimethylazobenzene | do | Red yellow. |
| 5 | 4-amino-2'-methoxy-2-methyl-5-methoxyazobenzene | do | Reddish brown. |
| 6 | 4-amino-2'-methoxy-2:5-dimethylazobenzene | do | Yellowish brown. |
| 7 | 4-amino-2:2'-dimethyl-4'-chloro-5-methoxyazobenzene | do | Do. |
| 8 | 4-amino-4'-chloro-2:2'-dimethylazobenzene | do | Orange brown. |
| 9 | 4-amino-4'-benzoylamino-2'-methyl-5-methoxy-azobenzene | do | Red brown. |
| 10 | 4-amino-4'-chloro-2-methyl-5-methoxyazobenzene | 4-benzylphenol | Do. |
| 11 | 4-amino-4'-chloro-2:5-diethoxyazobenzene | do | Do. |
| 12 | 4-amino-2'-chloro-2-methyl-5-methoxyazobenzene | do | Yellow brown. |
| 13 | 4-amino-3:2'-dimethylazobenzene | 4-methyl-2-benzylphenol | Do. |
| 14 | 4-amino-2'-methoxy-2-methyl-5-methoxyazobenzene | do | Do. |
| 15 | 4-amino-2'-methoxy-2:5-dimethylazobenzene | do | Do. |
| 16 | 4-amino-2:2'-dimethyl-4'-chloro-5-methoxyazobenzene | do | Do. |
| 17 | 4-amino-4'-benzoylamino-2-methyl-5-methoxyazobenzene | do | Reddish brown. |
| 18 | 4-amino-3:2'-dimethylazobenzene | 3-chloro-4-oxydiphenyl | Yellowish brown. |
| 19 | do | 4-methyl-2-benzylphenol | Do. |

Dyestuff 2 of the above table corresponds to the formula

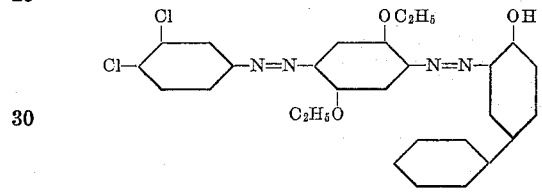

Dyestuff 17 of the above table corresponds to the formula

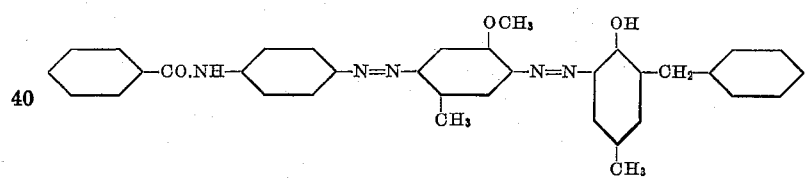

| | Diazotizing component | Coupling component | Dyeing produced on cotton |
|---|---|---|---|
| 1 | 4:4'-diamino-2'-methyl-5'-methoxyazobenzene. | 4-hydroxydiphenyl | Reddish brown. |
| 2 | do | 3-chloro-4-hydroxydiphenyl. | Do. |
| 3 | do | 4-methyl-2-benzylphenol. | Do. |
| 4 | do | 3-bromo-4-hydroxydiphenyl. | Do. |

Example 2

12.8 parts of 4:4'-diamino-2'-methyl-5'-methoxy-1:1'-azobenzene are stirred with 55 parts of cold water and tetrazotized by careful addition of a solution of 7.2 parts of sodium nitrite in 20 parts of water. The solution is stirred for a further ½ hour and filtered, if necessary. It is then slowly dropped into a solution consisting of 18.4 parts of 4-benzylphenol in 40 parts by volume of a sodium hydroxide solution of 30 per cent. strength, 50 parts of 2 n-sodium carbonate solution and 500 parts of water. Coupling takes place immediately with formation of a brown precipitate. Stirring is continued overnight, the whole is filtered and the precipitate thoroughly washed and dried. There are thus obtained 25 parts of a dark brown powder which can be recrystallized from chlorobenzene (4 parts). It melts at 199–201° C. and produces on cotton reddish brown tints. The new dyestuff corresponds to the formula

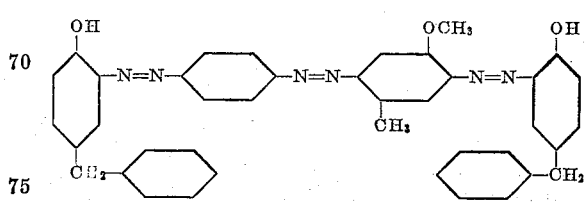

Example 3

17.8 parts of 4'-chloro-2'-nitrophenyl-1:1'-azo-3-methoxy-4-aminonaphthalene are stirred with 150 parts of acetic acid of 80 per cent. strength. There are then carefully added 15 parts of concentrated hydrochloric acid and a solution of 3.6 parts of sodium nitrite in 10 parts of water. After ½ hour the suspension of the diazo compound thus formed is allowed to run into a solution of 9.2 parts of 4-benzylphenol in 15 parts by volume of a sodium hydroxide solution of 30 per cent strength and 150 parts of water. Coupling takes place immediately with formation of a precipitate. Stirring is continued overnight, the whole is then filtered and the precipitate thoroughly washed and dried. The dyestuff is obtained as a dark powder which can be recrystallized from 5 parts of chlorobenzene. The new dyestuff of the formula

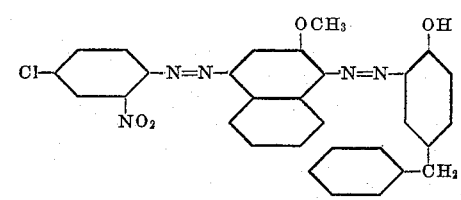

produces on cotton violet brown tints. Similar tints are obtained with the azo-dyestuff from 4-aminonaphthalene-1:1'-azo-naphthalene.

*Example 4*

99 parts of a 4-amino-1:1'-azobenzene-3:4'-disulfonic acid of 36 per cent. strength are dissolved in 750 parts of warm water, and to this solution there are added 7 parts of sodium nitrite and about 400 parts of ice, and then, while quickly stirring, 30 parts of concentrated hydrochloric acid. After ½ hour the clear solution is allowed to run into a solution consisting of 18.4 parts of 4-benzylphenol in 20 parts of a 10 times normal caustic soda solution, 2 parts of sodium carbonate and 250 parts of water. Coupling takes place immediately with formation of a brown precipitate. Stirring is continued over night and the dyestuff is salted out with common salt. It is a dark brown powder which dissolves in water to a dark brown solution and dyes wool from an acid bath brown yellow tints. The new dyestuff corresponds to the formula

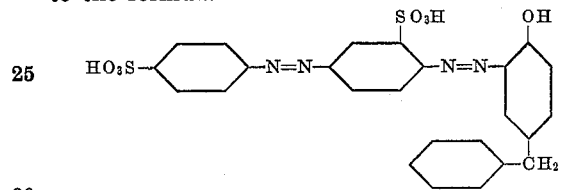

The following table also displays examples of further dyestuffs and their tinctorial properties:—

| | Diazotizing component | Coupling component | Dyestuff | Solution | Dyeing on wool |
|---|---|---|---|---|---|
| 1 | 4-amino-1:1'-azobenzene-3:4'-disulfonic acid | 4-hydroxydiphenyl | Dark brown | Brown | Yellow brown. |
| 2 | 4-amino-1:1'-azobenzene-4'-sulfonic acid | 4-benzylphenol | Brown | ...do... | Orange brown. |
| 3 | ...do... | 4-hydroxydiphenyl | Dark brown | ...do... | Yellow brown. |
| 4 | 4-amino-3:2'-dimethyl-1:1'-azobenzene-4-sulfonic acid | 4-benzylphenol | Brown | Light brown | Brown yellow. |
| 5 | ...do... | 4-hydroxydiphenyl | Dark brown | Brown | Yellow brown. |

What we claim is:—

1. The azo-dyestuffs of the general formula

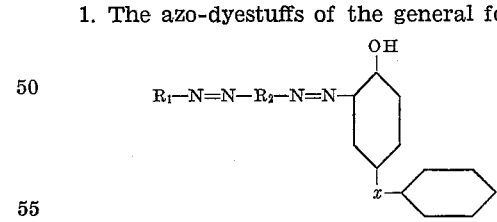

in which $R_1$ and $R_2$ stand for aromatic nuclei consisting themselves of not more than two condensed nuclei, at least one of these nuclei being monocyclic and not more than one representing a condensed dicyclic nucleus, one azo-group stands in 1-position and the other stands in 4-position to the radical $R_2$, and $x$ stands for a member of the group consisting of a diphenyl linkage and a $CH_2$—group, which products are free from sulfo groups and carboxyl groups.

2. The azo-dyestuffs of the general formula

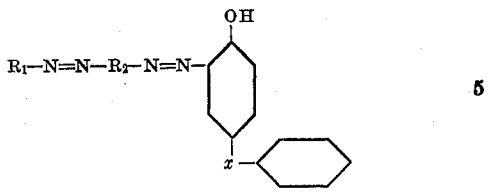

in which $R_1$ and $R_2$ stand for monocyclic aromatic nuclei, one azo-group stands in 1-position and the other stands in 4-position to the radical $R_2$, and $x$ stands for a member of the group consisting of a diphenyl linkage and a $CH_2$—group, which products are free from sulfo groups and carboxyl groups.

3. The azo-dyestuffs of the general formula

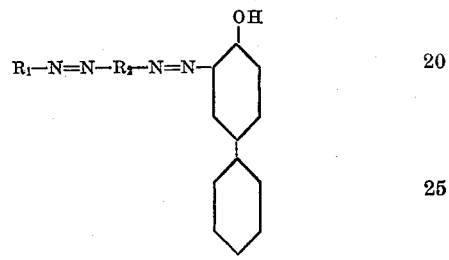

in which $R_1$ and $R_2$ stand for monocyclic aromatic nuclei, one azo-group stands in 1-position and the other stands in 4-position to the radical $R_2$, which products are free from sulfo groups and carboxyl groups.

4. The azo-dyestuffs of the general formula

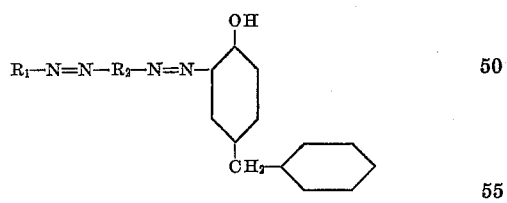

in which $R_1$ and $R_2$ stand for monocyclic aromatic nuclei, one azo-group stands in 1-position and the other stands in 4-position to the radical $R_2$, which products are free from sulfo groups and carboxyl groups.

CHARLES GRAENACHER.
RICHARD SALLMANN.
HANS JOHNER.